United States Patent
Joho et al.

(10) Patent No.: US 7,725,099 B2
(45) Date of Patent: May 25, 2010

(54) METHOD AND APPARATUS FOR LOCK CONTROL OF MOBILE TERMINAL DEVICE, COMPUTER PRODUCT

(75) Inventors: Junichi Joho, Kawasaki (JP); Yuji Kubota, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 473 days.

(21) Appl. No.: 11/342,836

(22) Filed: Jan. 31, 2006

(65) Prior Publication Data
US 2007/0087728 A1 Apr. 19, 2007

(30) Foreign Application Priority Data
Oct. 14, 2005 (JP) ............................. 2005-300348

(51) Int. Cl.
*H04M 3/16* (2006.01)
(52) U.S. Cl. ...................... 455/411; 455/410
(58) Field of Classification Search ............. None
See application file for complete search history.

(56) References Cited

U.S. PATENT DOCUMENTS

| 5,987,609 A | * | 11/1999 | Hasebe | ......................... 726/35 |
| 2002/0186845 A1 | * | 12/2002 | Dutta et al. | ................. 380/247 |
| 2006/0031399 A1 | * | 2/2006 | Sherman et al. | ............. 709/217 |

FOREIGN PATENT DOCUMENTS

| JP | 2000-181865 | 6/2000 |
| JP | 2001-268649 | 9/2001 |
| JP | 2001-337929 | 12/2001 |

* cited by examiner

*Primary Examiner*—Erika A Gary
(74) *Attorney, Agent, or Firm*—Fujitsu Patent Center (57) ABSTRACT

Specific information that can be stored in a mobile terminal device, changes over time, cannot be altered when a lock operation is requested, and can be acquired by an owner, such as a last-dialed telephone number, is managed as owner-specific authentication information, and, when an e-mail requesting a lock operation is extracted, a lock number for authentication for locking the mobile terminal device is calculated by using the owner-specific authentication information as a parameter.

12 Claims, 8 Drawing Sheets

| CATEGORY ITEM | CATEGORY VALUE |
|---|---|
| SECURITY CODE | 1234 |
| FINAL TELEPHONE NUMBER DIALED ON PREVIOUS DAY OR EARLIER | 0118092148 |
| LOCK NUMBER | 7084(=4×1234+2148) |

FIG.3

| CONTENT OF ELECTRONIC MESSAGE | | DESCRIPTION |
|---|---|---|
| Date | Wed, 20 Apr 2005 09:22:14 +0900 | TRANSMISSION TIME OF E-MAIL |
| From | fujitsu.tarou@jp.fujitsu.com | TRANSMITTER OF E-MAIL |
| To | fujitsu.tarou_5049q4512@docomo.ne.jp | MOBILE TELEPHONE E-MAIL ADDRESS |
| Subject | 7084 | TITLE OF E-MAIL (SPECIFYING LOCK NUMBER) |
| Message | Lock-on | MAIN TEXT OF E-MAIL (SPECIFYING OPERATION COMMAND) |

FIG.8

METHOD AND APPARATUS FOR LOCK CONTROL OF MOBILE TERMINAL DEVICE, COMPUTER PRODUCT

BACKGROUND OF THE INVENTION

1. Field of the Invention

The present invention relates to a technology for remotely locking a mobile terminal device.

2. Description of the Related Art

Some mobile terminals can be locked, i.e., the mobile terminal can be put in a state so that it can not accept key input by an unauthorized person. The locking operation includes setting a password. Various methods are available for setting the password. The password can be set, for example, by key-input or audio input. However, these methods are useful when the mobile terminal is available before the eyes. In other words, a password can not be set if the mobile terminal is misplaced or lost.

Japanese Patent Application Laid-Open (JP-A) No. 2000-181865 discloses a technique by which the password can be set by sending an e-mail to the mobile terminal. The email can be sent via any ordinary network, i.e., does not require special infrastructure.

However, the technique disclosed in JP-A No. 2000-181865 uses a conventional and simple password (security code) for authenticating the lock operation, and the password could often be acquired by a malicious third party. Thus, it is comparatively easy for the malicious third party to lock the mobile telephone, and difficult for the owner to prove own identity as the owner of the mobile telephone merely by transmitting the correct password via e-mail. This method therefore lacks security.

JP-A Nos. 2001-268649 and 2001-337929 disclose examples of techniques for improving password security. JP-A No. 2001-268649 uses a partial password consisting of a given digit from a password of, for example, sixteen digits, and JP-A No. 2001-337929 varies the password by using a dynamic security code that changes dynamically over time, thereby making sure that the password is not always fixed to a particular one. In the techniques disclosed in JP-A Nos. 2001-268649 and 2001-337929, digit information relating to a fluctuating password, time lapse information, and the like are presented by the target device such as a mobile telephone at a time of actually using and directly operating the target device, a user inputs a fluctuating password selected or calculated-according to the presented information, and the input password is authenticated. However, when the owner does not possess the target device due to misplacing it or the like, there is no way of learning the fluctuating password information, and consequently, these techniques cannot be applied in a remote e-mail method such as that disclosed in JP-A No. 2000-181865.

Therefore, the conventional e-mail method, although has the advantages of simplicity, is insufficient in improving the security of a lock method for identifying the owner of the mobile telephone and preventing its misuse by a third party.

SUMMARY OF THE INVENTION

It is an object of the present invention to at least solve the problems in the conventional technology.

According to an aspect of the present invention, a method of controlling locking of a mobile terminal device to lock the mobile terminal device so that the mobile terminal device can not be used, includes receiving e-mails via a communication network; analyzing received e-mails for an e-mail containing a set lock number and a request for a lock operation; managing specific information that can be any one of stored in and acquired by the mobile terminal device, changes over time, cannot be altered when a lock operation is requested, and can be acquired by an owner of the mobile terminal device, as owner-specific authentication information; calculating a calculated lock number from the owner-specific authentication information; checking whether the set lock number matches with the calculated lock number; and performing a locking operation to lock the mobile terminal device when the checking indicates that the set lock number matches with the calculated lock number.

According to another aspect of the present invention, an apparatus of controlling locking of a mobile terminal device to lock the mobile terminal device so that the mobile terminal device can not be used, includes a receiving unit configured to receive e-mails via a communication network; an analyzing unit that analyzes received e-mails for an e-mail containing a set lock number and a request for a lock operation; a managing unit that manages managing specific information that can be any one of stored in and acquired by the mobile terminal device, changes over time, cannot be altered when a lock operation is requested, and can be acquired by an owner of the mobile terminal device, as owner-specific authentication information; a calculating unit that calculates a calculated lock number from the owner-specific authentication information; an authenticating unit that checking whether the set lock number matches with the calculated lock number; and a controlling unit that performs a locking operation to lock the mobile terminal device when the checking indicates that the set lock number matches with the calculated lock number.

According to still another aspect of the present invention, a computer-readable recording medium stores therein a computer program that causes a computer in a mobile terminal device to implement the method according to the present invention.

According to still another aspect of the present invention, the owner-specific authentication information is the time of a last e-mail transmitted to a specific address on the previous day or earlier from the mobile terminal device.

According to still another aspect of the present invention, the owner-specific authentication information is the number of calls made to the owner's home telephone on the previous day from the mobile terminal device.

According to still another aspect of the present invention, the owner-specific authentication information is specific information that is stored in the mobile terminal device by a setting operation executed by the owner beforehand.

According to still another aspect of the present invention, the owner-specific authentication information is the set time of an alarm, with specified alarm dates, set for the latest date up to the previous day.

According to still another aspect of the present invention, the owner-specific authentication information is the number of days remaining until the owner's birthday, based on a setting of the owner's birthday.

According to still another aspect of the present invention, the owner-specific authentication information is specific information that can be obtained by inquiry via a communication network.

According to still another aspect of the present invention, the owner-specific authentication information is a call charge of the previous month. According to still another aspect of the present invention; the method further includes causing the computer to execute selecting owner-specific authentication information from among a plurality of types of owner-specific authentication information according to the owner's choice. The managing includes managing selected owner-specific authentication information, and the calculating the calculated lock number from the selected owner-specific authentication information.

According to still another aspect of the present invention, the analyzing includes extracting an e-mail whose title consists only of numbers signifying the set lock number and whose main text consists of a lock command.

According to still another aspect of the present invention, the owner-specific authentication information is specific communication history information of the previous day or earlier that can be stored in the mobile terminal device.

According to still another aspect of the present invention, the owner-specific authentication information is specific information that is stored in the mobile terminal device by a setting operation executed by the owner beforehand.

According to still another aspect of the present invention, the owner-specific authentication information is specific information that can be obtained by inquiry via a communication network. According to still another aspect of the present invention, the apparatus further includes comprising a selecting unit that selects owner-specific authentication information from among a plurality of types of owner-specific authentication information according to the owner's choice. The managing unit manages selected owner-specific authentication information, and the calculating unit calculates the calculated lock number from the selected owner-specific authentication information.

According to still another aspect of the present invention, the analyzing unit extracts an e-mail whose title consists only of numbers signifying the set lock number and whose main text consists of a lock command.

According to still another aspect of the present invention, the owner-specific authentication information is specific communication history information of the previous day or earlier that can be stored in the mobile terminal device.

According to still another aspect of the present invention, the owner-specific authentication information is specific information that is stored in the mobile terminal device by a setting operation executed by the owner beforehand.

According to still another aspect of the present invention, the owner-specific authentication information is specific information that can be obtained by inquiry via a communication network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail with reference to the accompanying drawings. Although a mobile telephone is explained here as an example of a mobile terminal device, the present invention can be applied to any other mobile terminal device, such as a PDA.

Figure 1:
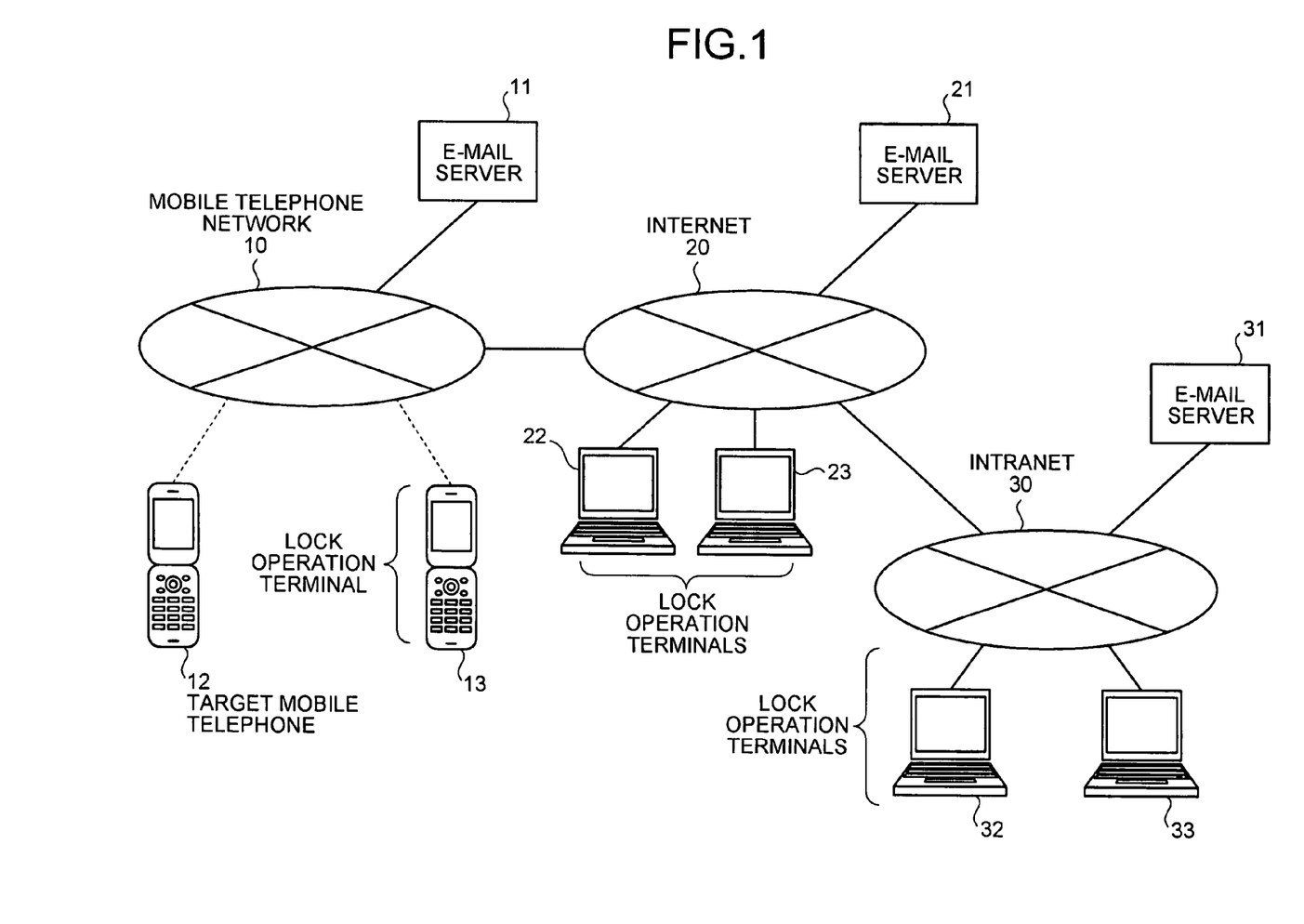
FIG. 1 is a schematic of a lock control system according to an embodiment of the present invention.

FIG. 1 is a schematic of a lock control system according to an embodiment of the present invention. The lock control system includes a plurality of mobile telephones 12, 13 connected to a mobile telephone network 10. An e-mail (electronic mail) server 11 is connected to the mobile terminal device. It is assumed here that the mobile telephone 12 is a target to be locked.

The mobile telephone network 10 is connected to an Internet network 20. The Internet network 20 is connected to an intranet network 30. The Internet network 20 includes an e-mail server 21. The intranet network 30 includes an e-mail server 31. Personal computers 22 and 23 are connected to the Internet network 20. Personal computers 32 and 33 are connected to the intranet network 30. The mobile telephones 12 and 13 and the personal computers 22, 23, 32, 33 can transmit e-mails to others and receive e-mails from others.

When the owner of the mobile telephone 12 misplaces the mobile telephone 12, another mobile telephone 13, or a given and desired terminal among the personal computers 22, 23, 32, and 33, is used to send an e-mail to the mobile telephone 12 to lock it. Such an e-mail includes a lock number and a request to perform a lock operation. When the mobile telephone 12 receives the e-mail, a locking mechanism in the mobile telephone 12 gets activated whereby the mobile telephone 12 gets locked.

Thus, an e-mail is used to lock the target mobile telephone 12. By using e-mail, whose use as an Internet service is proliferating, a user can issue a lock command through a remote operation in an environment the owner is familiar with, without being restricted to a specific terminal device. This simplifies the lock operation and increases convenience. Moreover, the operation can be executed using an existing system, without constructing a new system.

The lock number is used to check whether the person issuing the command is the owner of the mobile telephone 12. The lock number used in this embodiment aims to reduce the load of a control process in the mobile telephone 12 while ensuring the security of the lock method. The lock number includes, as parameters, a four-digit security code, which the owner generally sets in the mobile telephone 12, and owner-specific authentication information including specific information known by the user that changes over time. The lock number is stored in the mobile-telephone 12, and it cannot be altered when a lock is requested.

It is assumed in the embodiment that the owner-specific authentication information is the last-dialed telephone number that is dialed by the owner of the mobile telephone 12 from the mobile telephone 12 on the previous day or earlier. In that case, the lock number is calculated using Equation (1):

$$\text{Lock number} = f(\text{Security code, Last four digits of the last-dialed telephone number}) \quad (1)$$

The last-dialed telephone number is the last telephone number among those that were dialed using the mobile telephone 12 on the previous day or earlier. The last-dialed telephone is typically the last-dialed telephone number dialed on the previous day.

The last-dialed telephone number is used here because it possesses following characteristics:
A. It is generally stored and managed in the mobile telephone 12 as the communication history;
B. It can be memorized by human (i.e., acquired intellectually) and can be used in calculations;
C. It is information that changes according to dynamic change determined at will by the owner of the mobile telephone 12 and is generally known only by the owner; and
D. It is information that does not change even when a third party who acquires the mobile telephone 12 dials a number or performs an update or the like, Because it is information of the previous day or earlier.

That is, the last-dialed telephone number is specific information that is known to and can be acquired only by the owner, can be stored in the mobile telephone 12, changes over time, and cannot be altered when a lock operation is requested.

By using information that can be stored and managed in the mobile telephone 12, the mobile telephone 12 can calculate the lock number and perform an authentication using the lock number. Because the information can be memorized by human and used in calculations, the owner can easily calculate the lock number without relying on the mobile telephone 12. Because the information is arbitrary determined at will by the owner of the mobile telephone 12 and changes dynamically, it is generally known only by the owner and capability of verifying the owner of the mobile telephone 12 is increased, while making it difficult for a third party to obtain and copy the information, thereby increasing the level of security. Moreover, because a third party who obtains the mobile telephone 12 cannot change information of the previous day or earlier even by dialing, updating, or the like, the lock number can not be unduly altered by the third party, thereby increasing the level of security.

Equation (2) is an example of a specific calculation of Equation (1):

$$\text{Lock number} = (\text{Last digit of security code} \times \text{Security code} + \text{Last four digits of the last-dialed telephone number}) \quad (2)$$

This calculation includes an addition as well as a multiplication that uses some of the parameters, and is a remarkably simple calculation that reduces the calculation load on the mobile telephone 12 and can be easily performed by the owner himself. It can also be modified so that the security code and the last-dialed telephone number cannot be learned from a determined number, thereby increasing the level of security. In Equation (2), when the last digit of the security code is zero, security can be increased by maximizing the number of each digit of the security code.

Figure 2:
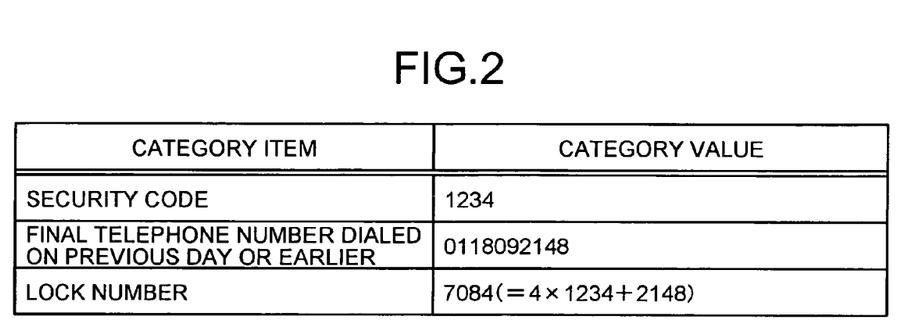
FIG. 2 is an explanatory diagram of an example of specific category values of the mobile telephone and of lock numbers that are determined from these specific category values by using Equation (2)

FIG. 2 is an explanatory diagram of an example of. parameters that can be used in Equation (2). When a security code 1234 and a last-dialed telephone number 0118092148 are employed, a lock number 7084 can be calculated using Equation (2).

Figure 3:
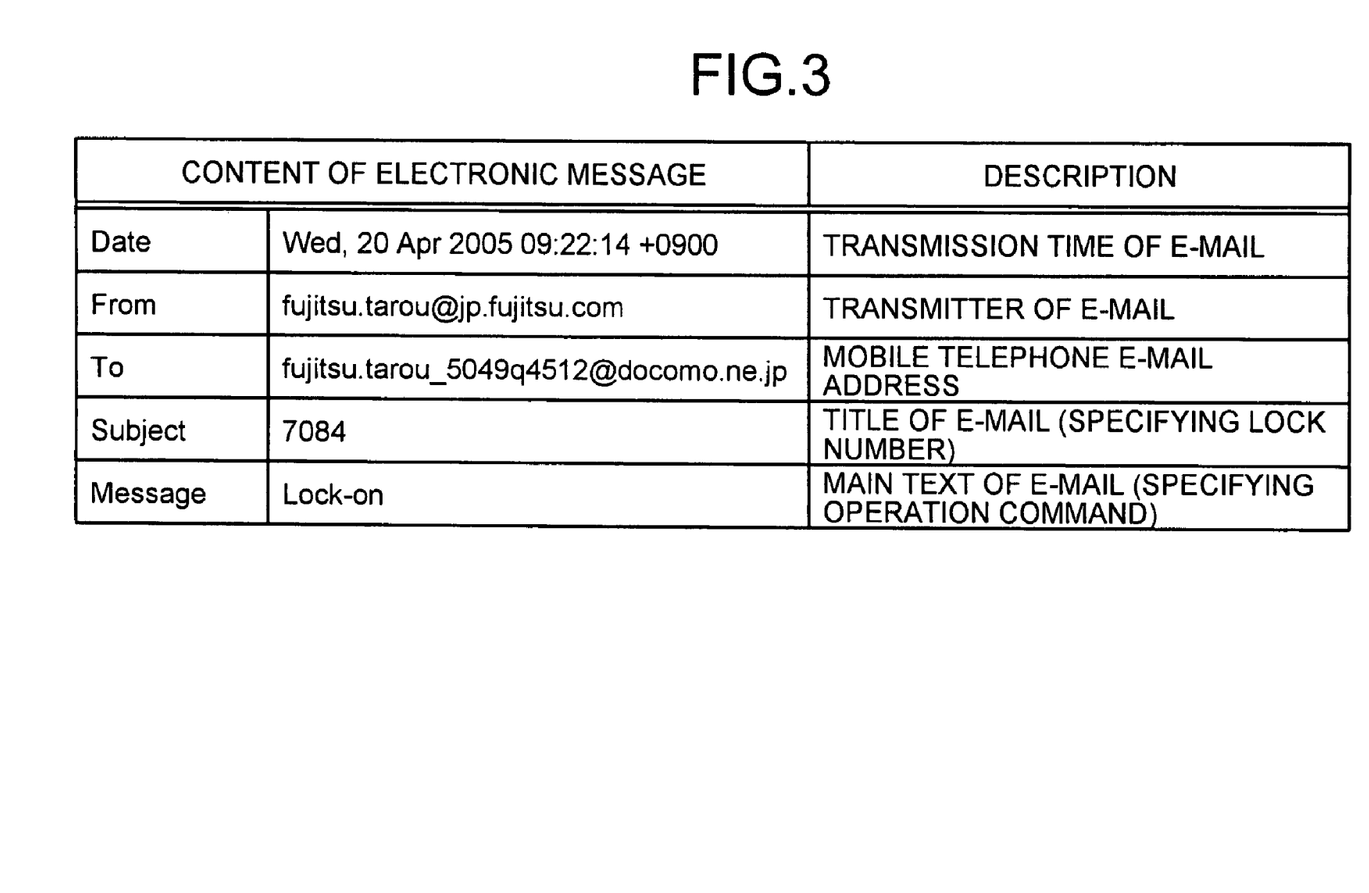
FIG. 3 is an explanatory diagram of an example of an e-mail message.

FIG. 3 is an explanatory diagram of an example of an e-mail message that is transmitted to the mobile telephone 12 to requests the mobile telephone 12 to perform a lock operation. The e-mail is created transmitted from the mobile telephone 13, which is a requester terminal. Information consisting only of numbers that form a lock number (i.e., 7084 ) requiring authentication determined by a calculation by the owner is specified in the title (subject) of the e-mail, and a lock command Lock on is specified in the main text (message) of the e-mail, thereby forming an e-mail that requests a lock operation.

Figure 4:
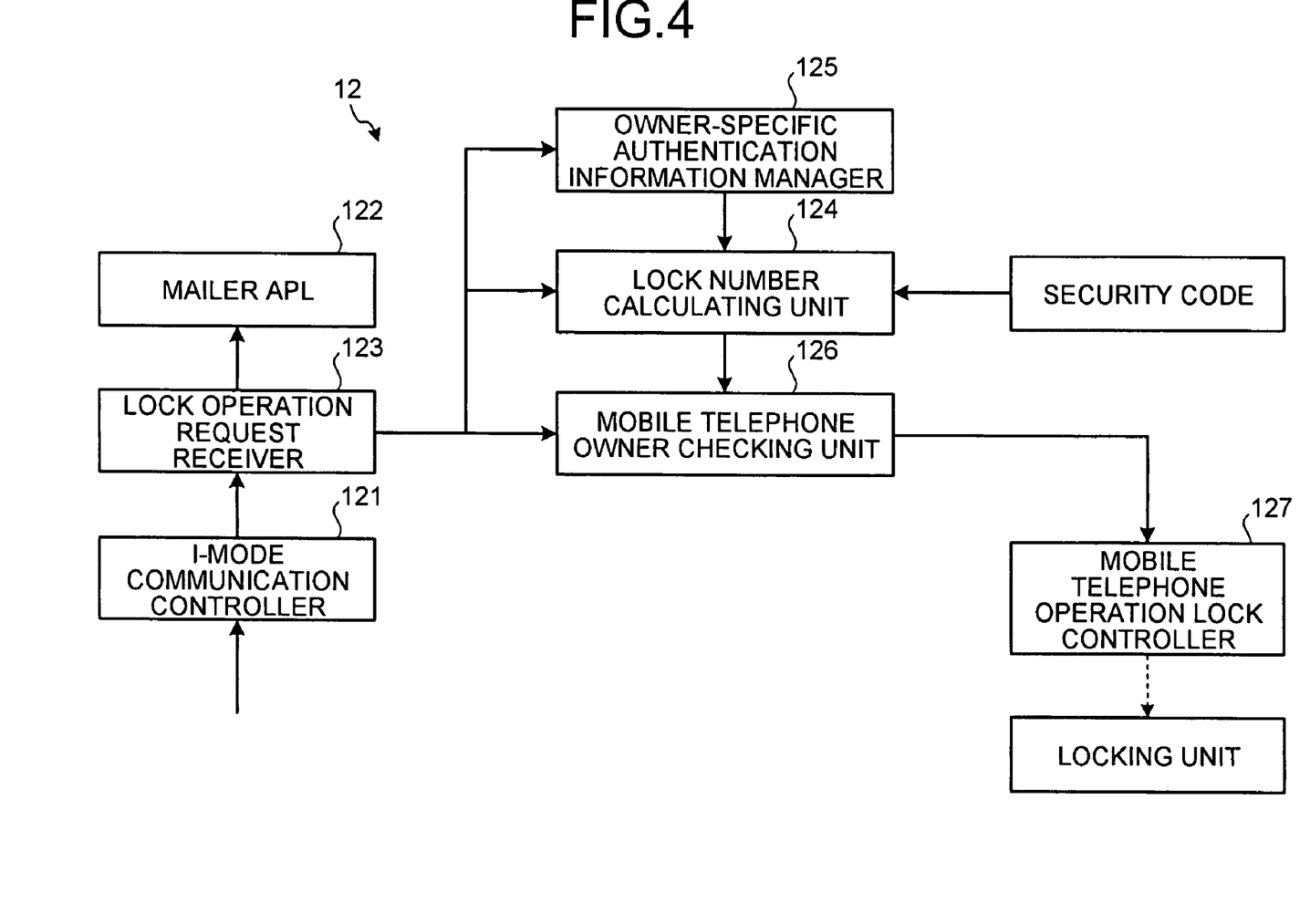
FIG. 4 is a functional block diagram of the mobile telephone shown in FIG. 1.

The methodology described above can be realized in existing system by making a computer, having a microcomputer configuration that includes a central processing unit (CPU) installed in the mobile telephone 12 with a conventional locking mechanism for incapacitating operations, execute a lock control program that realizes a software function explained below. FIG. 4 is a functional block diagram of the mobile telephone 12. The mobile telephone 12 includes an i-mode (Registered Trademark) communication controller 121, a mailer application (APL) 122, a lock operation request receiver 123, a lock number calculating unit 124, an owner-specific authentication information manager 125, a mobile telephone owner checking unit 126, and a mobile telephone operation lock controller 127.

The i-mode communication controller 121 and the mailer APL 122 execute procedures for receiving normal e-mails, transmitted from the e-mail server 11 and the like via the mobile telephone network 10. The mailer APL 122 receives e-mail messages based on communication control by the i-mode communication controller 121 and the like.

The lock operation request receiver 123 is provided between the i-mode communication controller 121 and the mailer APL 122. The lock operation request receiver 123 executes an e-mail analysis procedure of analyzing the contents of received e-mails, extracting e-mails whose title consists only of numbers that signify a lock number and whose main text consists of a lock command, as e-mails that request a lock operation, and transmitting them to the lock number calculating unit 124, the owner-specific authentication information manager 125, and the mobile telephone owner checking unit 126.

The owner-specific authentication information manager 125 manages the last-dialed telephone number as the specific information that changes over time, can be acquired by the owner, can be stored in the mobile telephone 12, and cannot be altered when a lock operation is requested. Specifically, the owner-specific authentication information manager 125 uses communication history information, which is constantly stored in a memory of the mobile telephone 12 each time a communication is made, and, when the lock operation request receiver 123 extracts an e-mail that requests a lock operation, the owner-specific authentication information manager 125 selects the last-dialed telephone number that is fixed at that time from the communication history information, and manages the dialed telephone number together with the calculation of the lock number calculating unit 124.

When the lock operation request receiver 123 extracts an e-mail that requests a lock operation, the lock number calculating unit 124 performs a calculation procedure to calculate a lock number for authentication in compliance with, for example, Equation (2) using the security code set beforehand in the mobile telephone 12 by the owner, and the last-dialed telephone number supplied by the owner-specific authentication information manager 125, as parameters.

The mobile telephone owner checking unit 126 performs a checking procedure to check whether the lock number requiring authentication that is contained in the e-mail requesting a lock operation matches the lock number for authentication that is calculated by the lock number calculating unit 124. If the result of this check is a match, the mobile telephone owner checking unit 126 requests the mobile telephone operation lock controller 127 to lock the mobile telephone 12.

Upon receiving a request for a lock operation from the mobile telephone owner checking unit 126, the mobile telephone operation lock controller 127 performs a lock control procedure to lock the mobile telephone 12 so that its keys and the like become incapacitated, by activating a locking unit installed in the mobile telephone 12. On the other hand, if the lock number requiring authentication does not match the lock number for authentication as the result of the above check, the mobile telephone operation lock controller 127 does not lock the mobile telephone 12.

Figure 5:
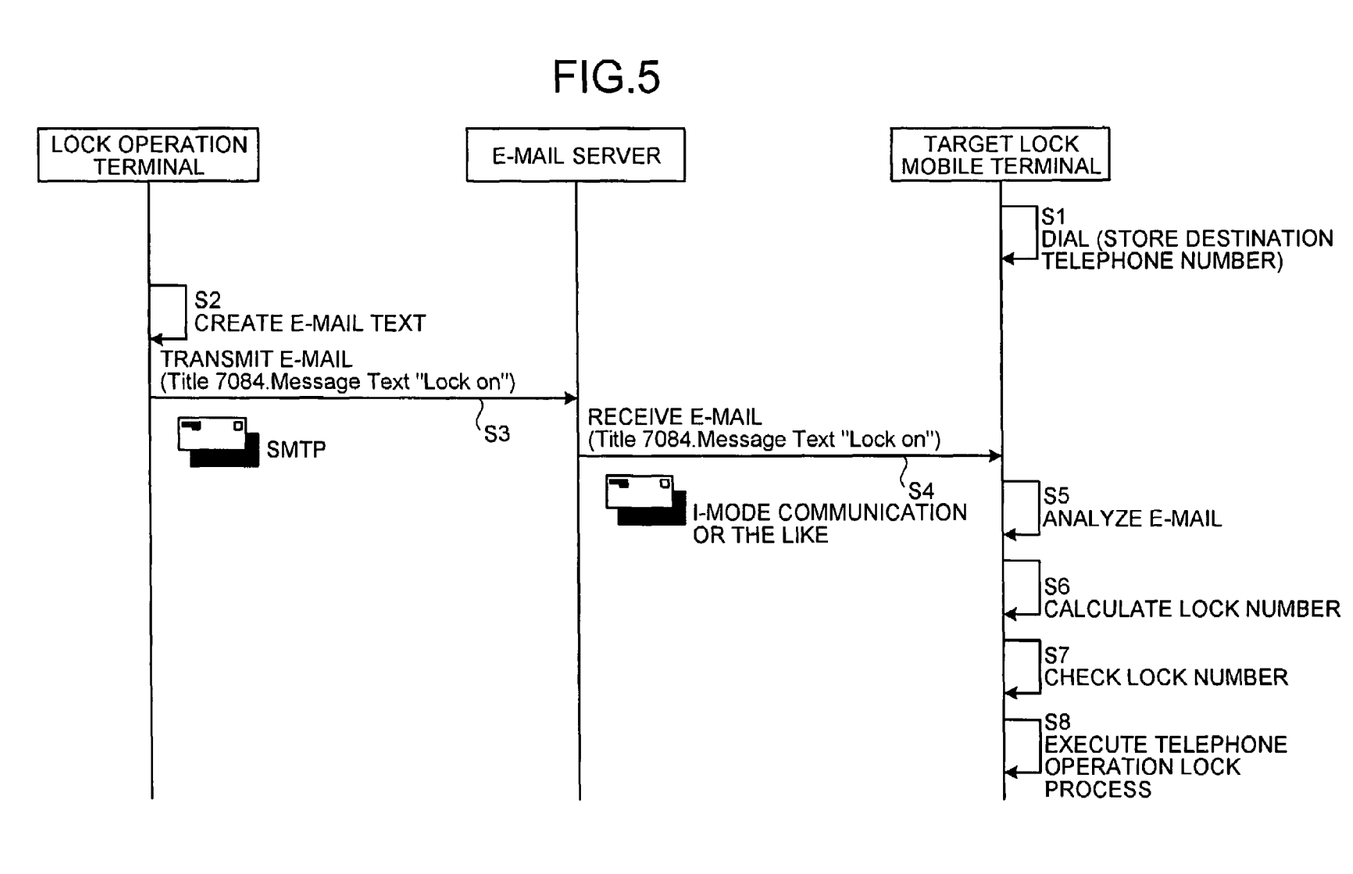
FIG. 5 is a time sequence diagram for explaining a remote lock operation.

An operational example of a remote lock operation in the lock control system for mobile telephone such as that shown in FIG. 1 will be explained. FIG. 5 is a schematic flowchart of an operational example of the remote lock operation in the lock control system for mobile telephone of this embodiment. The process example shown in FIG. 5 is performed by lock operation terminals such as the mobile telephone 13 and the personal computers 22, 23, 32, 33, the e-mail server 11, and the target mobile telephone 12. It is assumed that telephone numbers dialed on the mobile telephone 12 are sequentially stored and managed as a dial history (step S1).

The owner who misplaces or loses the mobile telephone 12 uses a lock operation terminal of his choice to create an e-mail text including a lock number and requesting a lock operation, to lock the mobile telephone 12 by a remote operation (step S2). At this time, the owner uses the lock number calculated in compliance with Equation (2), using the security code, and the last-dialed telephone number which the owner memorizes, as parameters. In the example show in FIGS. 2 and 3, the owner creates an e-mail text whose title is the lock number 7084 and whose main text is the command Lock on. The owner then uses a simple mail transfer protocol (SMTP) function to transmit the e-mail from the lock operation terminal to the e-mail server with the mobile telephone 12 as the destination (step S3).

This e-mail is transmitted via the e-mail server 11, and received at the mobile telephone 12 by the i-mode communication controller 121 and the mailer APL 122 (step S4). The lock operation request receiver 123 analyzes the content of the received e-mail (step S5). Because the title of the e-mail consists only of the lock number and its main text consists only of the lock command, the lock operation request receiver 123 extracts it as an e-mail that requests a lock operation and transmits it to the lock. number calculating unit 124, the owner-specific authentication information manager 125, and the mobile telephone owner checking unit 126. The lock number calculating unit 124 calculates the lock number for authentication in compliance with the calculation of Equation (2) that uses the security code and the last-dialed telephone number as parameters (step S6). The mobile telephone owner checking unit 126 checks whether the lock number contained in the e-mail requesting the lock operation matches the calculated lock number for authentication (step S7). If they match, the mobile telephone operation lock controller 127 executes a lock process by activating the locking unit, thereby incapacitating the mobile telephone 12 (step S8).

Thus, when the mobile telephone 12 is misplaced or lost, the mobile telephone 12 can be locked by a simple remote operation of transmitting an e-mail that requests a lock operation and includes a lock number that requires authentication from a lock operation terminal to the mobile telephone 12. Therefore, there are no particular restrictions on the lock operation terminal that can be used and this embodiment can be realized by using an existing communication network without constructing a new system or a mechanism. If the last-dialed telephone number, which can be stored in the mobile telephone 12, changes over time, cannot be altered when a lock operation is requested, and can be remembered by the owner, is managed as the owner-specific authentication information, when an e-mail that requests a lock operation is extracted, the lock number for authentication that is used to lock the mobile telephone 12 is calculated by using the last-dialed telephone number being managed as a parameter. The last-dialed telephone number is, therefore, information that can generally be known only by the owner, Because it changes over time, cannot be altered when a lock operation is requested, and can be remembered by the owner. Therefore, the owner can calculate the correct lock number even without possession of the mobile telephone 12 and use the lock number in a remote operation via e-mail. By using such a lock number to authenticate the lock operation, the owner can prove the ownership of the mobile telephone while preventing a third party from copying the lock number, thereby increasing the level of security for the lock operation.

When Equation (1) or (2) is used to calculate the lock number, if the lock number is leaked to a third party, the third party can use the lock number to perform the remote operation during the period from the moment of the leak until the last-dialed telephone number changes. To further increase security in such cases, in a second embodiment, a lock number including, among its parameters, information that relates to the transmission time of an e-mail requesting a lock operation can be used, in which case, the lock number is determined from the following functional equation.

Lock number=g (Security code, last-dialed telephone number, E-mail transmission time)   (3)

The e-mail transmission time is the time at which the e-mail that requests the lock operation is transmitted. It is information that can be arbitrary changed at will by the owner, being determined dynamically and specifically. The lock number is thus determined specifically at the time of locking, and cannot be recreated by a third party even if it is leaked. This ensures a highly secure lock number, and can guarantee operation by the owner.

Equation (4) is an example of a specific calculation of Equation (3):

Lock number=(Last digit of security code×tens-digit of time in seconds of e-mail transmission time)× Security code+Last four digits of last-dialed telephone number   (4)

As in Equation (2), this calculation includes an addition as well as multiplications that use some of the parameters, being a remarkably simple calculation that reduces the calculation load on the mobile telephone 12 and can be easily performed by the owner. It can also be modified so that the security code and the last-dialed telephone number cannot be learned from the determined number.

While the last-dialed telephone number is used as the owner-specific authentication information that changes over time, can be acquired by the owner, can be stored in the mobile telephone 12, and cannot be altered when a lock operation is requested, this is not limitative, and various types of specific information can be used.

For example, other types of communication history information relating to the previous day or earlier that can be stored in the mobile telephone 12 can be used as the owner-specific authentication information, such as the time of the last e-mail transmitted on the previous day or earlier, the time of the last e-mail transmitted to a specific address on the previous day or earlier, the number of calls made to the user's home telephone on the previous day. This information has similar characteristics to those of the last-dialed telephone number and satisfies the conditions of specific information, i.e., it changes over time, can be memorized (acquired) by the owner, can be stored in the mobile telephone 12, and cannot be altered when a lock operation is requested. It is therefore effective in determining a highly secure lock number.

The owner-specific authentication information is not limited to specific communication history information, and can also be based on specific information that is set in advance and stored in the memory of the mobile telephone 12 by the owner. For example, the owner-specific authentication information can be the set time of an alarm, with specified alarm dates, set for the latest date up to the previous day, or the number of days remaining until the owner's birthday, based on a setting of the owner's birthday. This information satisfies the conditions of specific information, i.e., it changes over time, can be memorized (acquired) by the owner, can be stored in the mobile telephone 12, and cannot be altered when a lock operation is requested. It is therefore effective in determining a highly secure lock number.

The owner-specific authentication information is not limited to information that can be stored in the mobile telephone 12, and can be specific information that can be obtained from the outside by inquiry via a communication network such as the mobile telephone network 10. For example, a call charge of the previous month relating to the mobile telephone 12 can be used as the owner-specific authentication information.

The call charge of the previous month has the following characteristics.

A. It is information that can be obtained and managed from outside by the mobile telephone 12 by making a charge inquiry.

B. It is information that can be acquired only by the owner from a charge notification report posted to the owner, and can be used in calculations.

C. Telephone charges generally changes from month to month.

D. It is information that cannot be altered by a third party.

That is, it is information that can be obtained by the mobile telephone 12, changes over time, cannot be altered when a lock operation is requested, and is specific information that can be acquired by the owner.

Figure 6:
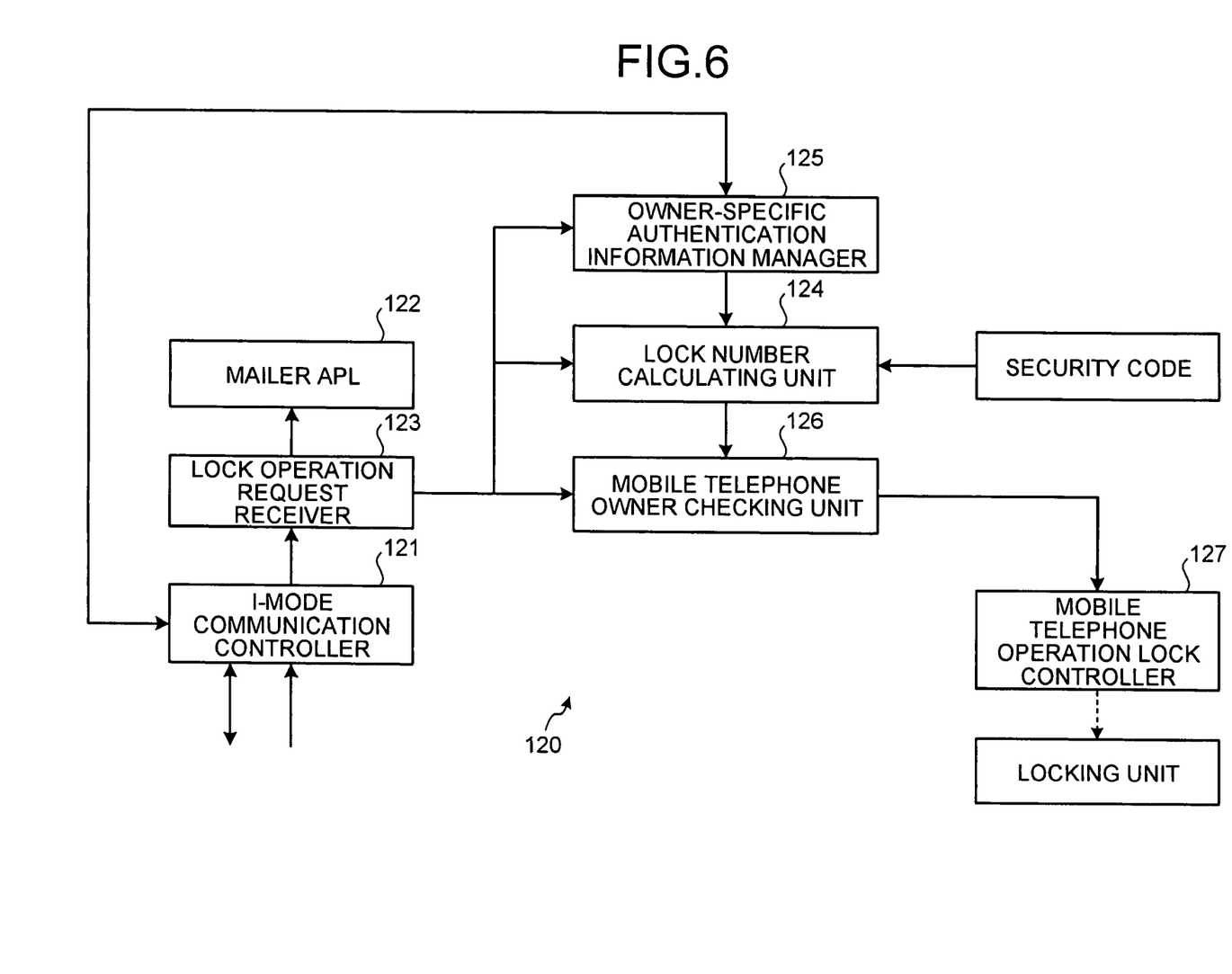
FIG. 6 is a functional block diagram of a mobile telephone according to a third embodiment of the present invention.

FIG. 6 is a functional block diagram of the configuration of a mobile telephone 120 when using the call charge of the previous month in a third embodiment of the present invention. When an e-mail that requests a lock operation is extracted, the owner-specific authentication information manager 125 performs procedures of sending an inquiry regarding the call charge of the previous month as an inquiry for information to an outside center or the like via a communication control of the i-mode communication controller 121 or the like, obtaining the call charge of the previous month as the owner-specific authentication information, and supplying information on the call charge of the previous month to the lock number calculating unit 124. The lock number calculating unit 124 calculates the lock number using this information relating to the call charge of the previous month as one of the parameters instead of the last-dialed telephone number. Moreover, the owner who has misplaced or lost the mobile telephone 120 can calculate the lock number by referring to the call charge of the previous month that is written in a charge notification kept at home or elsewhere.

Figure 7:
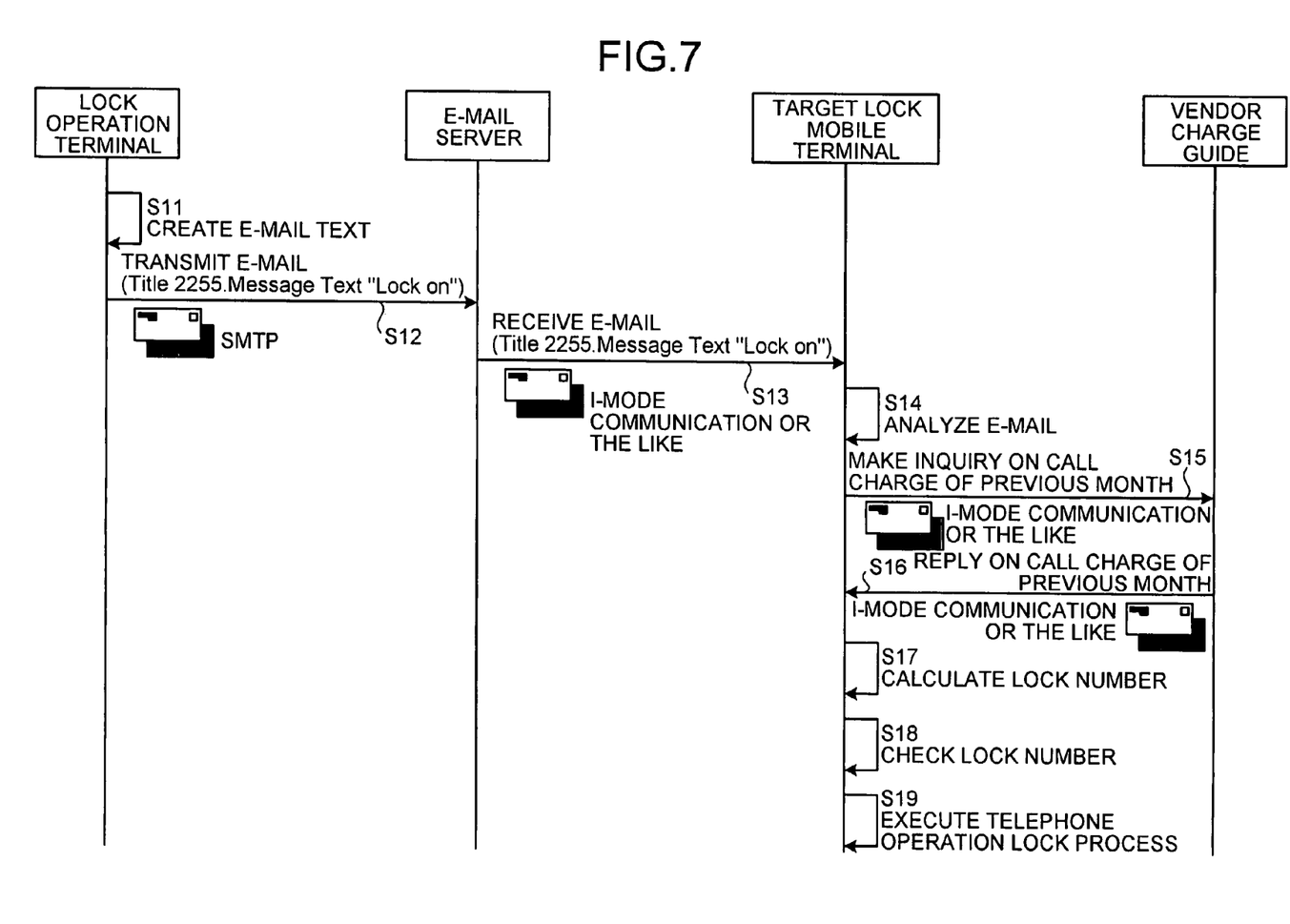
FIG. 7 is a time sequence diagram for explaining a remote lock operation in the third embodiment.

An operational example of a remote lock operation in the lock control system for mobile telephone such as that shown in FIG. 1 will be explained. FIG. 7 is a schematic flowchart of an operational example of a remote lock operation using the call charge of the previous month in the third embodiment. The process example shown in FIG. 7 is performed by lock operation terminals such as the mobile telephone 13 and the personal computers 22, 23, 32, and 33, the e-mail server 11, the target mobile telephone 120, and a vendor charge guide of an outside center.

The owner who has misplaced or lost the mobile telephone 120 uses a lock operation terminal of his choice to create an e-mail text including a lock number and requesting a lock operation, to lock the mobile telephone 12 by a remote operation (step S11). At this time, the owner uses a lock number calculated in compliance with a predetermined calculation based on Equation (2), using the security code and the call charge of the previous month written in the charge notification as parameters. It is assumed herein that a lock number 2255 is calculated, the title of the e-mail is 2255, and the main text consisting of the command Lock on is created. The owner then uses the SMTP function to transmit the e-mail from the lock operation terminal to the e-mail server with the mobile telephone 120 as the destination (step S12).

This e-mail is transmitted via the e-mail server 11, and received at the mobile telephone 120 by the i-mode communication controller 121 and the mailer APL 122 (step S13). The lock operation request receiver 123 analyzes the content of the received e-mail (step S14). Because the title of the e-mail consists only of the lock number and its main text consists only of the lock command, the lock operation request receiver 123 extracts it as an e-mail that requests a lock operation and transmits it to the lock number calculating unit 124, the mobile telephone owner checking unit 126, and the owner-specific authentication information manager 125. The owner-specific authentication information manager 125 makes an inquiry to a vendor charge guide of the center regarding the call charge of the previous month according to the communication control of the i-mode communication controller 121 and the like (step S15), obtains a response information containing the call charge of the previous month from the center (step S16), and supplies the information to the lock number calculating unit 124. The lock number calculating unit 124 calculates the lock number for authentication in compliance with a predetermined calculation that uses the security code and the call charge of the previous month as parameters (step S17). The mobile telephone owner checking unit 126 checks whether the lock number contained in the e-mail requesting the lock operation matches the calculated lock number for authentication (step S18). If they match, the mobile telephone operation lock controller 127 executes a lock process by activating the locking unit, thereby incapacitating the mobile telephone 120 (step S19).

The owner-specific authentication information need not be set beforehand to one type of information for all the mobile telephones. In a fourth embodiment according to the present invention, each owner can select owner-specific authentication information of own choice beforehand from among a plurality of types of owner-specific authentication information including, for example, the last-dialed telephone number, the time of the last-dialed e-mail transmitted on the previous day or earlier, the number of calls made to the user's home telephone on the previous day, the set time of an alarm, with specified alarm dates, set for the latest date up to the previous day, the number of days remaining until the owner's birthday, and the call charge of the previous month.

Figure 8:
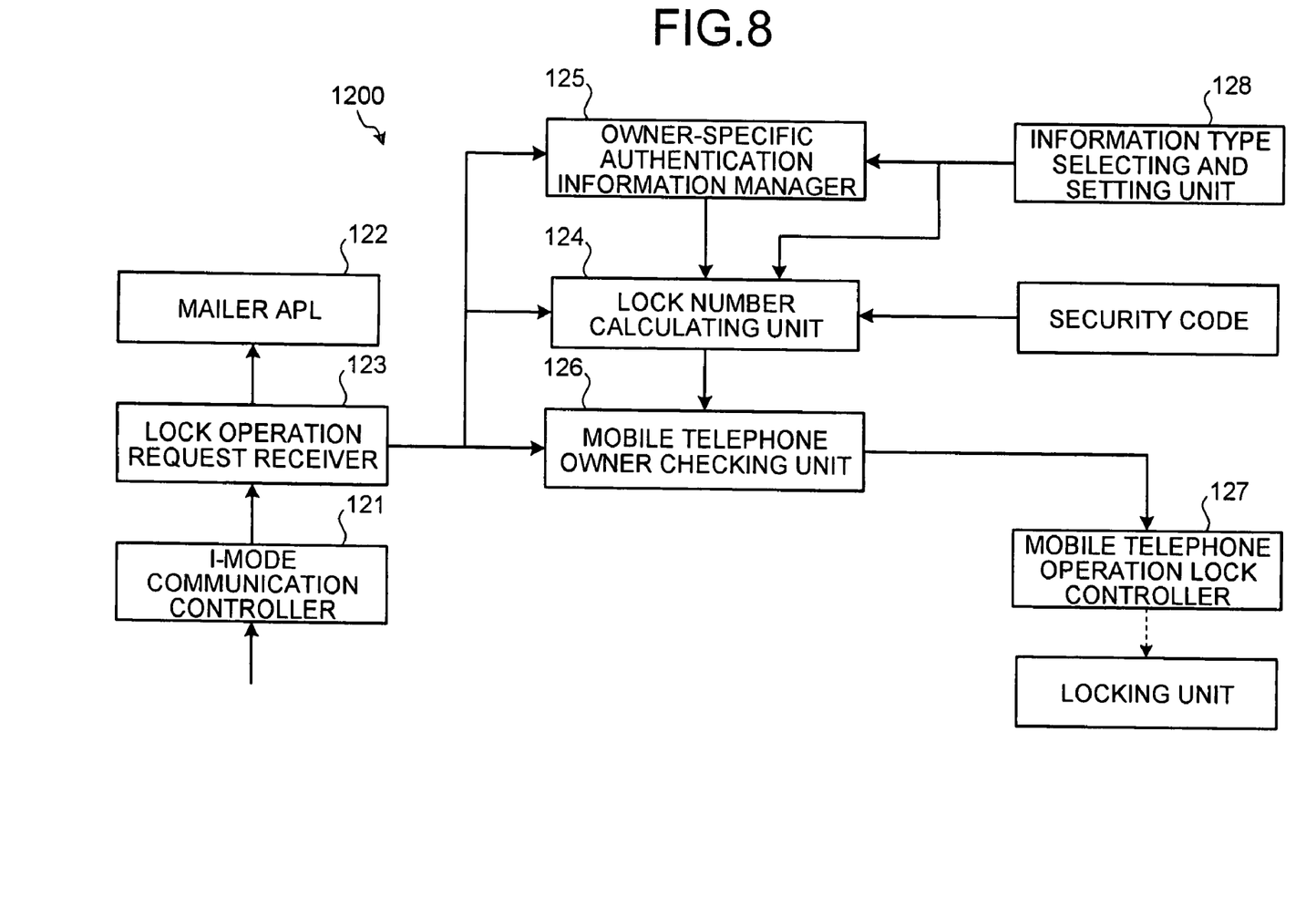
FIG. 8 is functional block diagram of a mobile telephone according to a fourth embodiment of the present invention.

FIG. 8 is functional block diagram of the configuration of a mobile telephone 1200 according to the fourth embodiment. The mobile telephone 1200 according to the fourth embodiment includes an information type selecting and setting unit 128 that notifies the lock number calculating unit 124 and the owner-specific authentication information manager 125 of owner-specific authentication information that is selected and set beforehand via an operating unit. The owner-specific authentication information manager 125 manages one type of owner-specific authentication information that is selected and set by the information type selecting and setting unit 128 from among the plural types of owner-specific authentication information, and, when an e-mail that requests a lock operation is extracted, supplies that information to the lock number calculating unit 124. The lock number calculating unit 124 calculates the lock number by a predetermined calculation, using the one type of owner-specific authentication information that is selected and set by the information type selecting and setting unit 128 from among the plural types of owner-specific authentication information as a parameter.

By selecting and setting owner-specific authentication information of the owner's choice from plural types of owner-specific authentication information, managing the selected and set owner-specific authentication information, and using it in the calculation of the lock number in this manner, owner-specific authentication information of the owner's choice can be used for determining the lock number in each mobile telephone instead of uniformly setting the owner-specific authentication information in all the mobile telephones. This increases reliability when identifying the owners while making it more difficult for a third party to plagiarize, and increases the level of security of the lock numbers that are determined based on the owner-specific authentication information. Because information that is easily remembered by each owner can be selected and set, the calculation of the lock number is facilitated and is more convenient.

The present invention includes an e-mail reception procedure, step, or means, which receives an e-mail transmitted via a communication network; an e-mail analysis procedure, step, or means, which analyzes the received e-mail, and extracts an e-mail that includes a lock number requiring authentication and requests a lock operation; a checking procedure, step, or means, which checks whether the lock number contained in the e-mail requesting a lock operation matches the lock number calculated in the lock number calculation procedure; and a lock control procedure, step, or means, which, when a match is obtained in the checking procedure, uses a locking unit to lock a mobile terminal device. Therefore, when the mobile terminal device is misplaced or lost, it can be locked by a simple remote operation of transmitting an e-mail which includes a lock number requiring authentication from a given lock operation terminal, which is connected to a communication network and which requests a lock operation, to the mobile terminal device. There are no particular restrictions on the lock operation terminal that can be used, and there is no need to construct a new system or a mechanism. Therefore, it is possible to use an existing communication network. Furthermore, specific information that can be stored in and acquired by the mobile terminal device, changes over time, cannot be altered when a lock operation is requested, and can be acquired by an owner, is managed as owner-specific authentication information, and, when an e-mail requesting a lock operation is extracted, a lock number for authentication for locking the mobile terminal device is calculated by using the managed owner-specific authentication information as a parameter. Therefore, even if the owner does not have the mobile terminal device in his possession, a correct lock number can be calculated by the owner by using the owner-specific authentication information that changes over time, cannot be altered when a lock operation is requested, and generally can only be known by the owner, to be used for a remote operation via e-mail. When such a lock number is used in authenticating a lock operation, the owner of the mobile terminal device can be identified while preventing copying by a third party, thereby increasing the level of security of the lock operation.

According to the embodiments of the present invention, the level of security of the lock operation is further increased by using the owner-specific authentication information as well as a normal preset security code as parameters in determining the lock number.

Moreover, dynamic and specific information relating to the transmission time of the e-mail that requests the lock operation is also used as a parameter in determining the lock number. Thus, the lock number can be determined specifically at the time of executing the lock operation, thereby making it extremely difficult for a third party to plagiarize the lock number and further increasing the level of security of the lock number.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that causes a computer in a mobile terminal device to lock the mobile terminal device so that the mobile terminal device can not be used, the computer program causes the computer to execute:
   receiving e-mails via a communication network;
   analyzing received e-mails for an e-mail containing a set lock number and a request for a lock operation;
   managing authentication information;
   calculating a lock number from the authentication information based upon at least one of information relating to a transmission time of the e-mail, and communication history information of a previous day or earlier that is stored in the mobile terminal device;
   checking whether the set lock number matches with the calculated lock number; and
   performing a locking operation to lock the mobile terminal device when the checking indicates that the set lock number matches with the calculated lock number.

2. The computer-readable recording medium according to claim 1, wherein the calculating includes calculating the lock number from the information relating to the transmission time of the e-mail.

3. The computer-readable recording medium according to claim 1, wherein the calculating includes calculating the lock number based on a preset mathematical equation including at least one of addition, subtraction, and multiplication of the authentication information and at least one of the information stored in the mobile terminal device.

4. The computer-readable recording medium according to claim 1, wherein the communication history information includes at least a portion of a telephone number last dialed from the mobile terminal device.

5. The computer-readable recording medium according to claim 1, wherein the communication history information includes a time of a last e-mail transmitted on the previous day or earlier from the mobile terminal device.

6. The computer-readable recording medium according to claim 1,
   wherein the authentication information is specific information that is at least one of
      stored in or acquired by the mobile terminal device,
      changeable over time,
      not alterable when a lock operation is requested, and
      acquirable by an owner of the mobile terminal device.

7. A method of controlling locking of a mobile terminal device to lock the mobile terminal device so that the mobile terminal device can not be used, comprising:
- receiving e-mails via a communication network;
- analyzing received e-mails for an e-mail containing a set lock number and a request for a lock operation;
- managing authentication information;
- calculating a lock number from the authentication information based upon at least one of information relating to a transmission time of the e-mail, and communication history information of a previous day or earlier that is stored in the mobile terminal device;
- checking whether the set lock number matches with the calculated lock number; and
- performing a locking operation to lock the mobile terminal device when the checking indicates that the set lock number matches with the calculated lock number.

8. The method according to claim 7, wherein the calculating includes calculating the lock number from the information relating to the transmission time of the e-mail.

9. The method according to claim 7, wherein the calculating includes calculating the lock number based on a preset mathematical equation including at least one of addition, subtraction, and multiplication of the authentication information and at least one of the information stored in the mobile terminal device.

10. An apparatus of controlling locking of a mobile terminal device to lock the mobile terminal device so that the mobile terminal device can not be used, comprising:
- a receiving unit configured to receive e-mails via a communication network;
- an analyzing unit to analyze received e-mails for an e-mail containing a set lock number and a request for a lock operation;
- a managing unit to manage authentication information;
- a calculating unit to calculate a lock number from the authentication information based upon at least one of information relating to a transmission time of the e-mail, and communication history information of a previous day or earlier that is stored in the mobile terminal device;
- an authenticating unit to check whether the set lock number matches with the calculated lock number; and
- a controlling unit to perform a locking operation to lock the mobile terminal device when the authentication unit indicates that the set lock number matches with the calculated lock number.

11. The apparatus according to claim 10, wherein the calculating unit calculates the lock number from the information relating to the transmission time of the e-mail.

12. The apparatus according to claim 10, wherein the calculating unit calculates the lock number based on a preset mathematical equation including at least one of addition, subtraction, and multiplication of the authentication information and at least one of the information stored in the mobile terminal device.

* * * * *